INVENTORS
LARRY N. MC ELROY
VARO A. SHORES
BY Learman, Learman & McCulloch
ATTORNEYS 3,666,386
DIRECT RADIALLY EXTRUDING MIXER
Larry N. McElroy and Varo A. Shores, Saginaw, Mich., assignors to Baker Perkins Inc., Saginaw, Mich.
Filed Feb. 11, 1970, Ser. No. 10,387
Int. Cl. B29f 3/02
U.S. Cl. 18—12 SA                                    8 Claims

ABSTRACT OF THE DISCLOSURE

A direct extrusion mixer including a barrel forming a mixing passage or chamber having a material receiving inlet and a radially disposed extrusion outlet. A reciprocating and rotating mixer shaft is accommodated in the passage and includes gapped flights rearwardly of the extrusion outlet cooperating with kneading teeth on the barrell wall for mixing the material and forwarding the material toward the extrusion outlet. To eliminate output surges in the extrudate caused by the oscillating motion of the mixer shaft, the shaft has a plug with a symmetrical axially inclined rear face, the portion of the face immediately adjacent the outlet being substantially in radial alignment with the forward edge of the outlet at all times.

---

This invention relates to mixers and more particularly to a radial extrusion mixer or kneader employing a reciprocating and rotating shaft which is capable of effecting an even, steady flow of extruded material while substantially eliminating "dead" areas where forwarded material may "hang up" and deteriorate.

Mixers of the general type disclosed herein for processing synthetic plastics such as polystyrene, polyethylene, and polypropylene have been described in U.S. Pat. No. 3,023,455, which is assigned to the assignee of the present invention and incorporated herein by reference.

For optimum performance of the mixing apparatus, it is generally desirable to heat the plastic material being mixed, prior to extruding it through an outlet die part, to as high an extruding temperature as is compatible with the chemical stability of the material. The fractions of the heated plastic materials which have only a relatively short residence time in the heated zone are not adversely affected by the elevated temperature. However, with many plastic materials, those portions of the material which are unduly held up for any extended time in the high temperature zone, start to deteriorate and partially decompose or are scorched or burned. Particles of such material then break loose and are passed with the normal flow of plastic material through the outlet passage, to thereby contaminate the plastic material so that articles formed from such contaminated plastic material are of inferior quality.

It is an object of the present invention to provide a direct extrusion mixer which is designed to provide a uniform residence time for material passing through and produces extruded plastic material which is substantially free from partially deteriorated or burned plastic material particles.

Another object of the invention is the provision of an improved direct extrusion mixer in which all hang-up areas have essentially been eliminated.

It is yet another object of the invention to provide a new and improved direct extrusion mixer in which a steady and constant flow of material through the extrusion port or ports is assured so that subsequent operations such as cutting the material to length are facilitated.

Briefly, in accordance with the present invention, there is provided a mixer comprising: a barrel forming an axially extending mixing passage having an inlet through which material to be mixed is supplied, and a radially extending, material expressing outlet near the opposite end thereof, a mixer shaft having forwarding flight means in the passage extending rearwardly of the outlet for mixing material and advancing the material forwardly toward the outlet when the mixer and barrel are relatively moved, and drive mechanism for relatively revolving and reciprocating the barrel and mixer shaft, the mixer shaft having a front plug extending forwardly of the radial outlet with an axially inclined rear end face having a peripheral edge portion which is continually, substantially in radial alignment with the forward edge of the outlet during the stroke of the shaft.

Other objects and advantages of the invention will be pointed out specifically or will become apparent from the following description when it is considered in conjunction with the appended claims and the accompanying drawings in which:

FIG. 5 is a sectional side elevational view, illustrating the manner in which the mixing shaft may be simultaneously revolved and reciprocated.

Figure 1:
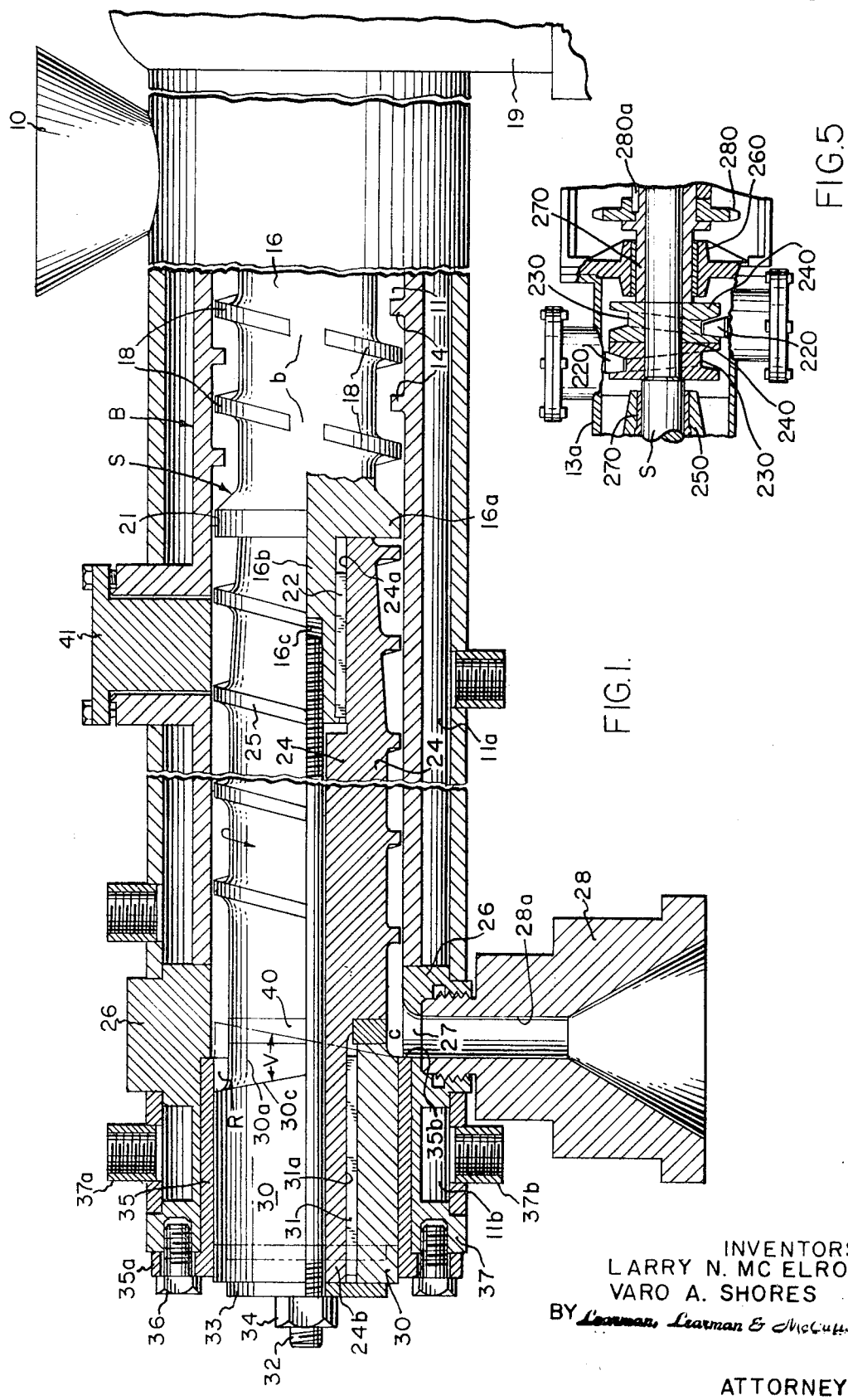
FIG. 1 is a partly sectional, side elevational view of a mixer formed according to the invention with the rotary and reciprocating mixer shaft being shown in forwardmost position and the rear position being illustrated by the chain lines.
Figure 2:
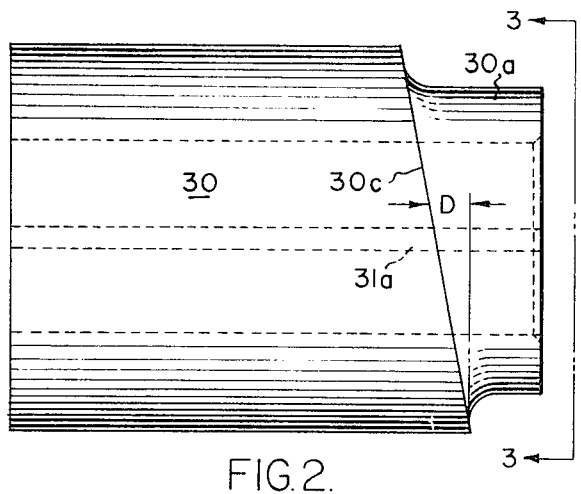
FIG. 2 is an enlarged side elevational view, more particularly illustrating the contoured plug which is mounted on the front end of the mixer shaft.

In the illustrated embodiment of the invention, a jacketed, tubular mixing barrel, generally designated B, is provided with annular passages 11a and 11b for circulating a heating or cooling fluid, depending on the mixing operation to be performed. The mixer apparatus also includes a feed hopper 10 leading into the mixer chamber passage or bore 11 of the barrel B for admitting the ingredients to be mixed to the passage 11. A mixing shaft S, which is suitably journaled concentrically within the barrel B, has a rear section 16 provided with interrupted helical threads or blades forming thread sections 18, which cooperate with the radially inwardly projecting circumferentially spaced teeth 14 provided in the barrel B in a manner disclosed in the patent mentioned. As described in the patent mentioned, the shaft S is rotated and reciprocated so that the stationary teeth 14, during the stroke of the shaft, are passed through the spaces "b" between the thread portions 18. Apparatus for relatively rotating and reciprocating the shaft S and the barrel B is described in the aforementioned patent and specifically illustrated in FIG. 3 thereof. Such apparatus is powered by suitable motor and gear reduction apparatus which may be housed in a housing 19 mounted at the rear of the unit.

From what may be termed primarily a mixing or kneading zone extending about the shaft section 16, the material passes forwardly through a reduced annular metering passage 21 formed by the barrel and an enlarged portion 16a of the shaft 16. Fixed to the reduced diameter front end, or stub shaft portion, 16b of the shaft section 16, by a suitable key 22, is a second mixer shaft section 24 having a partial bore 24a in the rearward end thereof receiving the stub shaft portion 16b.

The shaft section 24 includes a continuous helical blade 25 whose function is to advance the material, while at the same time achieving some further mixing action, to an extruding zone "c" within the barrel B. The barrel B, at this point, is provided with an annular front section 26 having an extrusion orifice 27 and threadedly mounting an extrusion adapter 28 having a passage 28a therein in communication with the extrusion orifice 27. It should be understood that dies may be added to the adapter 28, as required, or, if desired, the adapter 28 may be removed to accommodate another type adapter, which is more suitable for a particular purpose, by merely unthreading the adapter 28 from the ring 26.

Figure 3:
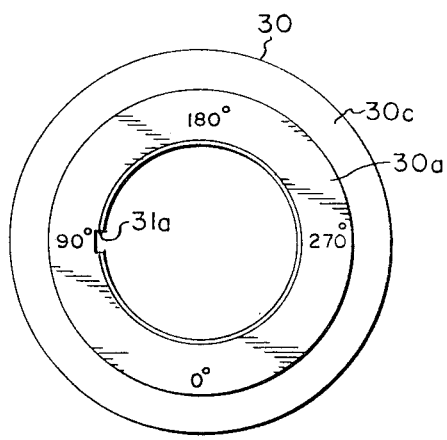
FIG. 3 is an end elevational view taken along the line 3—3 of FIG. 2.

The continuous helical blade or worm 25 is provided on the shaft section 24, which tapers towards its rear end as shown, and this thread or blade 25 tends to feed the material forwardly into the zone "c" even during the rearward portion of the reciprocatory stroke of the continuously rotating mixing shaft S. At its front end, the shaft portion 24 is provided with a reduced diameter portion 24b receiving a plug sleeve 30 which is fixed thereto by a key 31 received within a keyway 31a (FIG. 3). The shaft sections 16, 24 and 30 are axially secured together by a bolt 32 having one end threaded in a bore 16c in the reduced stub shaft portion 16b. At its other end the bolt 32 is provided with a retaining washer 33 and a retaining nut 34. The cooperating threads on the bolt 32, the bore 16c in shaft section 16b, and the nut 34, are of opposite hand relative to the rotation of the shaft S so that the connection tends to tighten with rotation rather than loosen.

A plug slide bearing sleeve 35, having a flange 35a, secured to the barrel section B with suitable bolts 36, is provided for journaling the plug section 30 of shaft S and the rearward end face 35a of the sleeve 35 is radially aligned with the forward edge of the die aperture 27. Any substantial leakage of material between the sleeve 35 and the plug 30 is prevented by controlling the temperature of the jacket portion 37 forming the passageway 11b in the barrel B by admitting fluid of the proper temperature through ingress and egress ports 37a and 37b.

Figure 4:
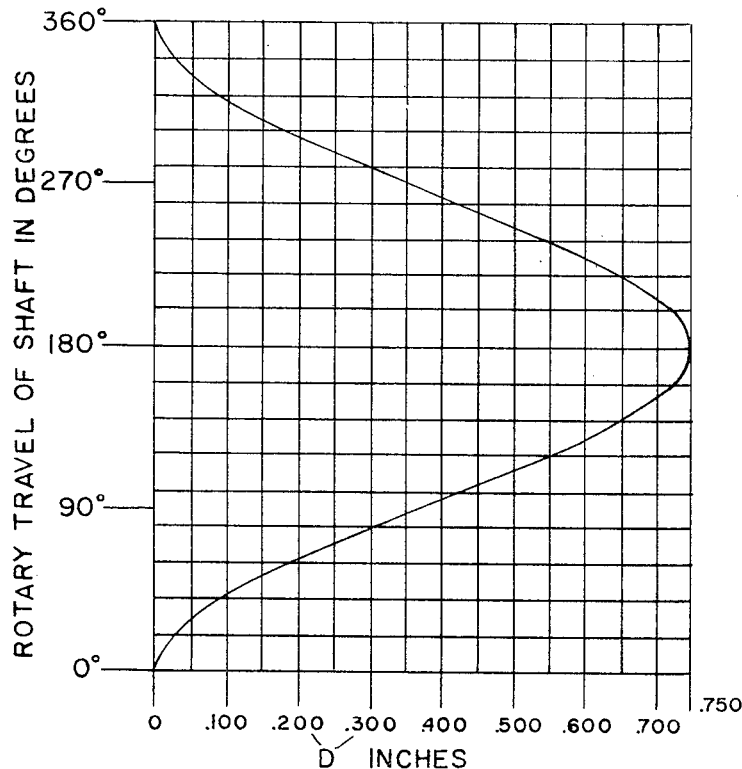
FIG. 4 is a graph relating the contour of the plug face with angular rotary movement of the mixer shaft.

The plug portion 30 has a reduced diameter stub shaft portion 30a and a symmetrically contoured rearward end surface 30c connecting the portion 30a with the front portion of plug 30. A portion of the peripheral face 30c is in radial alginment with the forwardmost edge of the die aperture 27 at all times during the reciprocatory stroke of the rotating shaft S. FIG. 4 graphically illustrates the profile of the face 30c. The graph relates the distance D which is the distance in inches from the rearmost portion of face 30c to any other portion thereof, with the angular displacement of the shaft S. As noted, the relationship maintained is such that, as the shaft S reciprocates and rotates, a portion of the face 30c is continually in radial alignment with the forwardmost edge of the die aperture 27 and the inner end face 35a of the bearing sleeve 35. In the structure described there are no dead areas in which material, which is forwarded beyond the extrusion port 27, may accumulate and deteriorate prior to being extruded through the port 27. The shape of face 30c is proper for a shaft which rotates 180° in the same direction during each of the forward and rearward portions of its stroke. FIG. 5 illustrates what may be termed control means for timing the relative reciprocation and rotation of the shaft S. A housing portion 13a rearwardly of the feed hopper 10, is provided with a pair of fixed cam follower projections 220 which ride in cam tracks 230, provided in a pair of side-by-side cams 240 which are keyed on the rear end of mixer shaft S as shown. As the shaft S is revolved by a motor through a suitable gear reduction unit, the rotary travel of the cams 240, which are fixed on shaft S, causes the shaft S to have an oscillating stroke. At its rear end the shaft S is supported in bearings 250 and 260 which are supported by the casing portion 13a. Fixed to the shaft portion S, as shown, to revolve and reciprocate with it, are wear sleeves 270. An axially stationary gear 280 keyed as at 280a on the rear slide bearing 270 is connected through a suitable gear reduction unit to the drive motor, and drives the rear sleeve 270 and shaft S. It should be understood, of course, that the shape of the face 30c, illustrated by the development in FIG. 4, is merely illustrative of shapes which may be effective to accomplish the same results. For example, a multi-lobed end surface could be utilized if the shaft were reciprocated at a higher frequency. A replaceable annular shim 40 is provided to permit adjustment of the position of the various parts, thereby facilitating the movement of the plug 30 toward and away from the shaft section 24 to insure continued alignment of the face 30c and the rear edge of the port 27.

The extruder portion of the shaft comprising the forwarding portion thereof downstream of flange 16a which is provided with the continuous helical screw 25 has a greater forwarding capacity than the upstream kneader portion and a vent plug 41 is provided in the usual manner to vent gaseous products.

In operation, material to be mixed and extruded is fed continuously to the machine through the hopper 10 in any suitable manner. Typical plastics which may be processed have been mentioned, but many plastics and other material may also be processed by the apparatus. The chamber 11 is maintained at the melting temperature of the material by circulating a heating medium through the barrel chambers 11a and 11b and the plastic material will be forwarded continuously by the flights 18. From the zone of primary mixing, adjacent the shaft section 16, the material moves to the reduced annulus 21 which passes a measured amount of material to the secondary advancing and mixing zone in which the screw or blade 25 operates to feed the material to the extrusion zone "c." As the plug 30 rotates and reciprocates, a portion of the end surface 30c, which essentially comprises a right hand helix portion and a left hand helix portion, is always radially aligned with orifice 27. This provides a straight line discharge at port 27. The velocity of the material moving axially forwardly toward the discharge port 27 is considerably greater on the forward portion of the stroke of the reciprocating shaft than on the return portion of the stroke. The volume V of the material filled reservoir or cavity R created on the forward portion of the stroke is such as to compensate for this reduced forward flow of material on the return portion of the stroke and eliminates the pulsations which would otherwise occur. The cavity volume is selected to accept only enough material to accomplish this and in effect operates as a surge tank which is emptied on each return portion of the stroke so that no over-supply of material can accumulate and degrade. The change in flow of the material in the extruder portion is in other words equal to or balanced by the change in volume of reservoir R throughout the stroke. In this way, a steady and continuous extrusion of the material out the extrusion orifice 27 is achieved during both the forward and return portion of the stroke of the mixing shaft S. Output surges otherwise caused by the oscillating motion of the reciprocating shaft S are thus eliminated without the need for a separate extruder. The design of the end plug 30 is unique in that it is of such size and shape as to compensate for the interrupted pumping action of the shaft S on the back stroke and equalizes the discharge flow between the back stroke and forward stroke.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention as disclosed in the appended claims.

I claim:
1. A mixer comprising:
   a barrel forming an axially extending passage having an inlet through which material to be mixed is supplied, and a material expressing radial outlet near the opposite end thereof;
   a mixer shaft;
   means for relatively revolving said barrel and said mixer shaft and for relatively reciprocating them in a forward and return direction;
   said mixer shaft having means in said passage extending rearwardly of said outlet for mixing material and advancing it forwardly toward said outlet when said mixer shaft and barrel are relatively moved;

said mixer shaft including material returning plug means shaped to provide a reservoir, generally forwardly of said outlet, for receiving a portion of said forwardly moving material, and for returning the received material rearwardly on the return portion of the stroke of the shaft so that material is expressed radially from said outlet in a steady stream when said mixer shaft and barrel are relatively moved, said plug means reservoir including an axially inclined end face; and control means for timing the relative reciprocation and rotation so that the portion of the face immediately adjacent the outlet is substantially in radial alignment with the forward edge of said outlet at all times and the material issues therefrom in a nonpulsing stream.

2. A mixer as set forth in claim 1 wherein said mixing and advancing means on the shaft comprises a helical screw interrupted at regular intervals and radially extending lugs in said barrel extend into said passage and are passed through said interruptions during the stroke of said shaft.

3. A mixer as set forth in claim 2 wherein said passage is cylindrically shaped and said end face is symmetrical about a diameter of said passage.

4. A mixer as set forth in claim 2 wherein said barrel includes a sleeve extending forwardly of said outlet means; said plug means being snugly, slidably, rotatably received in said sleeve.

5. A mixer as set forth in claim 4 wherein the rearward end face of said sleeve is in radial alignment with the forward edge of said outlet and said adjacent portion of the said end face.

6. A mixer comprising:

a barrel forming an axially extending passage having an inlet through which material to be mixed is supplied, and a material expressing radial outlet near the opposite end thereof;

an axially extending mixer shaft in said passage;

means for relatively revolving, and relatively forwardly and rearwardly reciprocating, said barrel and said mixer shaft;

said mixer shaft having means in said passage extending rearwardly of said outlet for mixing material and advancing it forwardly toward said outlet when said mixer shaft and barrel are relatively moved; and material receiving and returning means having a surface portion extending substantially axially forwardly from, and returning substantially to, a common axial location for receiving a portion of said forwardly moving material when the shaft is moving forwardly and returning said received material rearwardly on the return portion of the stroke of the shaft;

and control means for timing the relative reciprocating and rotation to cause the surface portion to be generally radially aligned with the outlet substantially at all times and to cause material to be expressed radially from said outlet in a substantially steady stream when said mixer shaft and barrel are relatively moved.

7. A mixer as set forth in claim 6 wherein said common location is said outlet.

8. A mixer comprising:

a barrel forming an axially extending passage having an inlet through which material to be mixed is supplied, and material expressing radial outlet means near the opposite end thereof;

a mixer shaft in said passage;

means for relatively revolving and reciprocating said barrel and said mixer shaft at a predetermined velocity, and with a predetermined axial stroke, to move material forwardly at a predetermined velocity on the forward portion of the stroke and at a reduced velocity on the return portion of the stroke;

said mixer shaft having advancing flight means in said passage extending rearwarding of said outlet means for mixing material and advancing it forwardly toward said outlet means when said mixer shaft and barrel are relatively moved;

a plug on the front end of said mixer shaft incorporating surge reservoir means of a volume effective on the forward portion of the stroke for receiving only a sufficient portion of said forwardly moving material to compensate for the reduced velocity of flow of material axially forwardly on the return portion of the stroke and having a radially outer surface portion; and control means for timing the relative reciprocation and rotation to cause said surface portion to be generally radially aligned with the outlet means substantially at all times and to cause the material to be expressed radially from said outlet in a substantially steady stream when said mixer shaft and barrel are relatively moved.

References Cited

UNITED STATES PATENTS 3,023,455   3/1962   Geier et al. _____ 18—12 SZ UX

J. SPENCER OVERHOLSER, Primary Examiner

N. E. LEHRER, Assistant Examiner

U.S. Cl. X.R.

259—40; 425—191, 208, 376